(12) United States Patent
Yoon

(10) Patent No.: US 7,427,097 B2
(45) Date of Patent: Sep. 23, 2008

(54) OPERATOR PROTECTIVE STRUCTURE FOR CONSTRUCTION MACHINE

(75) Inventor: Chun Jin Yoon, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 330 days.

(21) Appl. No.: 11/280,708

(22) Filed: Nov. 16, 2005

(65) Prior Publication Data

US 2006/0249986 A1 Nov. 9, 2006

(30) Foreign Application Priority Data

May 6, 2005 (KR) ............. 10-2005-0037939

(51) Int. Cl.
*B60J 7/00* (2006.01)
(52) U.S. Cl. ................ 296/190.03; 280/756; 180/89.12
(58) Field of Classification Search ............ 296/190.01, 296/190.03; 280/756; 180/89.12
See application file for complete search history.

(56) References Cited

U.S. PATENT DOCUMENTS 3,785,696 A 1/1974 Moore et al.
3,954,150 A 5/1976 Cole et al.
4,136,985 A 1/1979 Taul
4,987,522 A 1/1991 Miyano et al.

FOREIGN PATENT DOCUMENTS

| DE | 2 219 972 | 11/1973 |
|----|-----------|---------|
| DE | 91 04 258 | 8/1991 |
| JP | 8-218436 | 8/1996 |
| JP | 2003-232053 | 8/2003 |

OTHER PUBLICATIONS

Patent Abstracts of Japan of 2003-232053 dated Aug. 19, 2003.
Patent Abstracts of Japan of 8-218436 dated Aug. 27, 1996.

*Primary Examiner*—Joseph D Pape
(74) *Attorney, Agent, or Firm*—Ladas & Parry LLP

(57) ABSTRACT

An operator protective structure for a construction machine is designed to prevent a heavy object or a cabin of the construction machine deformed during the overturning or a drop collision from injuring a body of the operator. An operator protective structure includes a front supporting frame provided with a pair of front supporting rods vertically installed on one end of the upper frame, a rear supporting frame provided with a plurality of rear supporting rods vertically installed on the other end of the upper frame to encompass the cabin, and a top supporting frame defined by a pair of top supporting rods extended from an upper end of the front supporting frame to an upper end of the rear supporting frame and provided with a plurality of auxiliary beams between the top supporting rods.

8 Claims, 3 Drawing Sheets

OPERATOR PROTECTIVE STRUCTURE FOR CONSTRUCTION MACHINE

FIELD OF THE INVENTION

The present invention relates to structure for a construction machine, more specifically, to operator protective structure for a construction machine such as an excavator, a loader or the like. The operator protective structure is safety structure to protect the body of the operator from heavy object or from deformed cabin at the overturning of a construction machine or from a drop collision.

DESCRIPTION OF RELATED ART

In view of structure, a cabin of construction machine should be designed such that an operator works comfortably. Moreover, the operator should be protected from such an unexpected accident that a heavy object falls toward the cabin during the driving or the construction machine is overturned at a sloped terrain during the work in view of structure.

Recently, it is urgently required to develop a technology of cabin protective structure capable of securing the safety of operator on the spot as organizations such as the International Standardization Organization (ISO), the Society of Automatic Engineers (SAE) or the like become to reinforce the regulation for the cabin protective structure more strictly.

Such technology is generally classified into:

a rolling over protective structure (ROPS) which is designed to protect an operator in the event of a complete roll-over by preventing the deformed cabin from contacting with the body of operator;

a falling object protective structure (FOPS) which is designed to prevent an operator from being struck by a falling object such as a tree in forest work by preventing the deformed cabin from contacting with the body of operator; and a tip over protective structure (TOPS) which is designed to protect an operator by preventing a heavy object or the cabin deformed by the side or rear direction collision from contacting with the body of operator.

Each of the protective structure is generally provided with strength reinforcing structure on the front, the rear and the top of the cabin to prevent the deformation of the cabin from invading the threshold boundary of driver's work.

Since the above-described conventional operator protective structure of a construction machine is directly installed on a front wall of a cabin as a frame structure, there is a problem that a safety accident is occurred to injure the operator by excessively damaging or deforming the cabin when a complete roll-over accident happens due to the weak structure against the side or the rear load or an unexpected load applied by a heavy object.

In order to overcome the above-described problems, there has been disclosed a technique to protect the cabin during the generation of complete roll-over accident. The technique has a box-shaped frame made of the metal bars, and the frame is mounted on an upper frame of a lower driving body of construction machine through a base member. From a structural point of view, this technique must add a plurality of welding portions to the metal bar to be connected to the external surface of the cabin for the sake of strength maintaining and reinforcing, and particularly, it does not suggest a protection means when an unexpected vertical load due to a heavy object is applied to the cabin. Therefore, it involves a problem that top cover of the cabin are torn or damaged by a falling heavy object.

SUMMARY OF THE INVENTION

The present invention has been made to overcome the above-described problems in the related art. It is, therefore, an object of the present invention to provide an operator protective structure capable of maintaining the strength of each frame by constructing a frame structure to encompass a cabin in a side, a rear and a vertical directions, as well as minimizing the deformation of cabin by dispersing load applied to the operator protective structure and protecting operator from a heavy object or deformed cabin.

In accordance with an aspect of the present invention, there is provided an operator protective structure installed on a cabin of construction machine, wherein the cabin is mounted on an upper frame rotatably mounted on a lower driving body, the structure comprising a front supporting frame provided with a pair of front supporting rods vertically installed on one end of the upper frame, a rear supporting frame provided with a plurality of rear supporting rods vertically installed on the other end of the upper frame to encompass the cabin, and a top supporting frame defined by a pair of top supporting rods extended from an upper end of the front supporting frame to an upper end of the rear supporting frame and provided with a plurality of auxiliary beams between the top supporting rods.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Hereinafter, a preferred embodiment of the present invention is described in detail with reference to the accompanying drawings, which does not mean defining the technical spirit and scope of the present invention but explains in detail the present invention in order for one skilled in the art to which the present invention pertains to implement the present invention.

Figure 1:
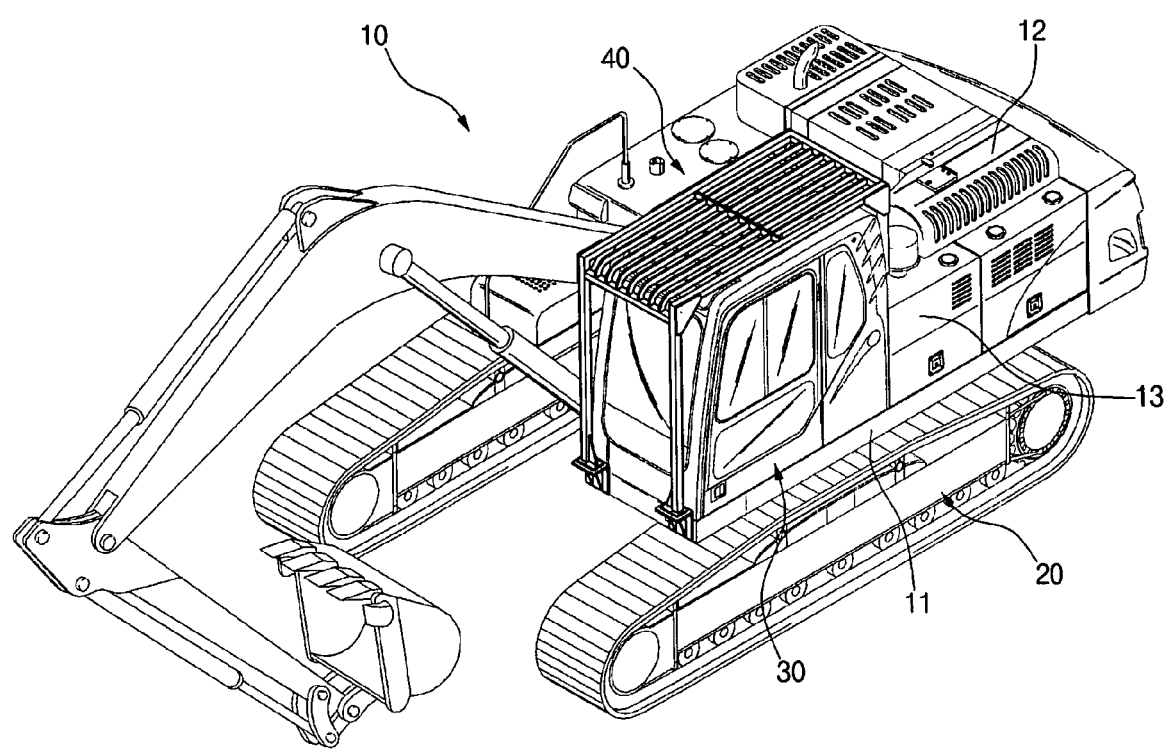
FIG. 1 is a schematic perspective view showing a state of a construction machine equipped with an operator protective structure in accordance with one embodiment of the present invention.
Figure 2:
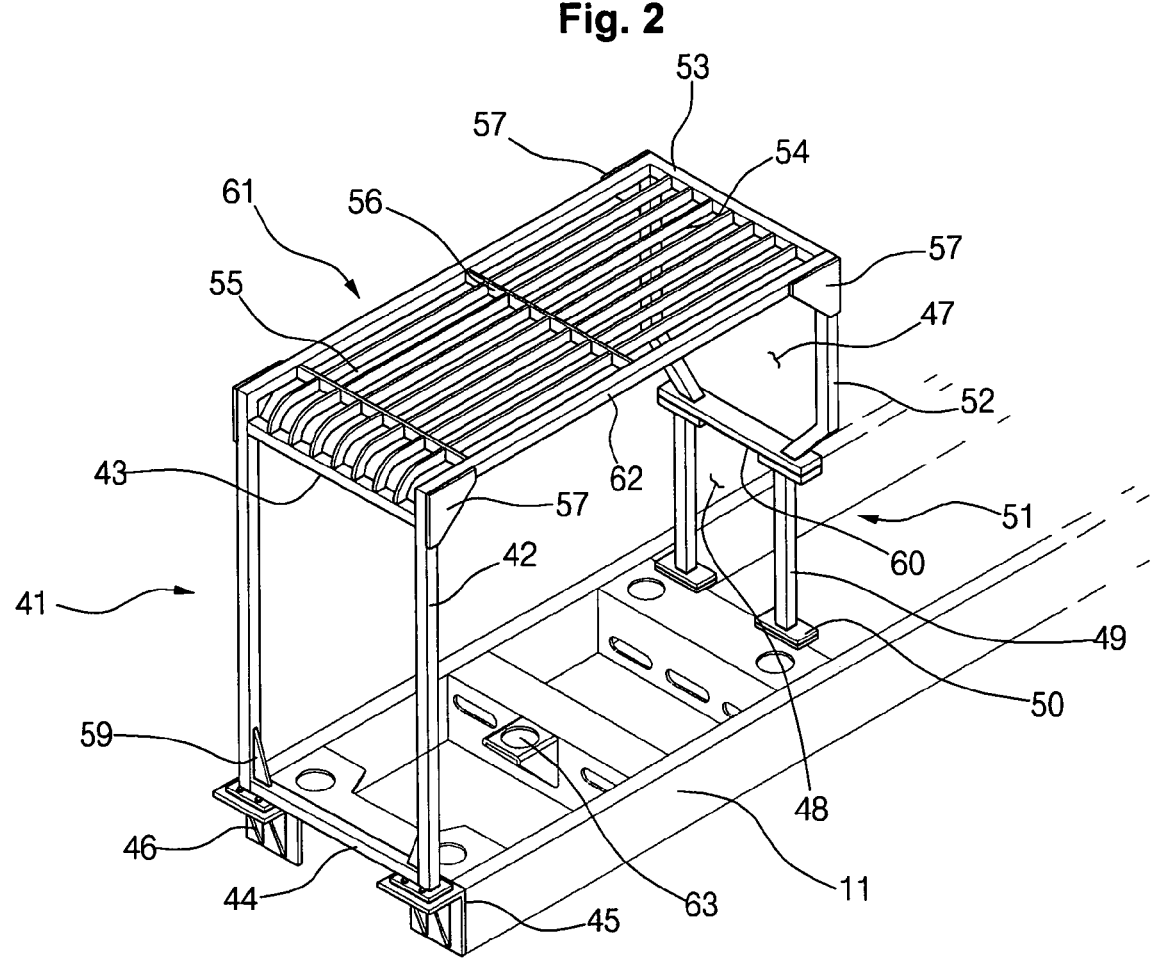
FIG. 2 is a perspective view representing the operator protective structure for the construction machine in accordance with the embodiment of the present invention.
Figure 3:
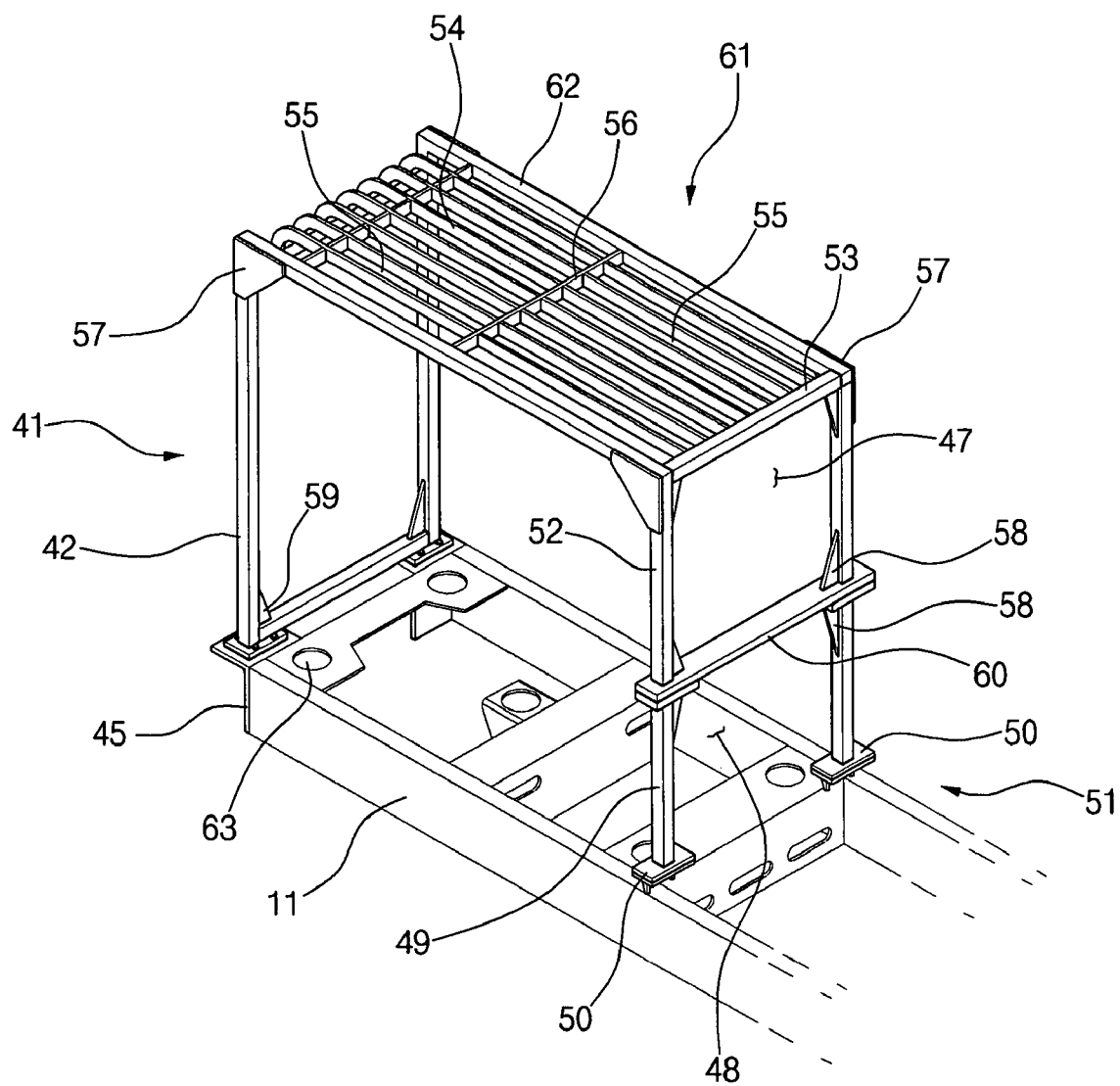
FIG. 3 is a perspective view representing an operator protective structure for a construction machine in accordance with another embodiment of the present invention.

FIG. 1 is a schematic perspective view showing a state of a construction machine equipped with an operator protective structure in accordance with one embodiment of the present invention, FIG. 2 is a perspective view representing the operator protective structure for the construction machine in accordance with the embodiment of the present invention and FIG. 3 is a perspective view representing an operator protective structure for a construction machine in accordance with another embodiment of the present invention.

As shown in the drawings, the operator protective structure 40 in accordance with the embodiment of the present invention is designed in such a way that it effectively protects a cabin 30 of the construction machine 10 even when the construction machine 10 is overturned or a load of a heavy material is unexpectedly applied to the cabin 30 from the side, the rear and the vertical directions. The construction machine 10 is provided with the cabin 30 mounted on an upper frame 11 which is pivotally connected to a lower driving body 20.

The operator protective structure 40 is formed as a frame structure on the external side of the cabin 30 which is obtained by constructing a front supporting frame 41 vertically equipped with a pair of front supporting rods 42 on one end of the upper frame 11, a rear supporting frame 51 vertically equipped with a rear supporting rods 49 and 52 to cover the cabin 30 at the other end of the upper frame 11 with a cross member 60 fixed in the middle thereof, and an top supporting frame 61 defined by a pair of top supporting rods 62 extended from an upper end of the front supporting frame 41 to an upper end of the rear supporting frame 51.

The front supporting frame 41 forms a rectangular frame structure as a whole by constructing a pair of front supporting rods 42 extending from the both ends of a bottom plate 44 to the both ends of an top plate 43. The vertical lower portions of each of the front supporting rods 42 or both ends of the bottom plate 44 forming lower edges of the rectangular frame structure are fixedly installed on the upper frame 11 by a pair of front brackets 45. The upper frame 11 is rotatably mounted on the lower driving body 20 of the construction machine 10.

Each of the first reinforcing pieces 59 is attached to inner sides of the lower edges of the front supporting frame 41 and a plurality of slant pieces 46 is attached to outsides of the pair of front brackets 45 to support the vertical load applied through the front supporting rods 42.

The rear supporting frame 51 forms a rectangular frame structure as a whole similar to the front supporting frame 41. The rear supporting frame 51 is provided with rear supporting rods. The rear supporting rods comprises rear upper supporting rods 52 and rear lower supporting rods 49. A cross member 60 is fixedly installed on external side of the cabin 30 between the rear upper supporting rods 52 and the rear lower supporting rods 49 so as to prepare each of an upper supporting frame 47 and a lower supporting frame 48. More particularly, the upper supporting frame 47 is defined by the cross member 60 and the rear upper supporting rods 52 and the lower supporting frame 48 is defined by the cross member 60 and the rear lower supporting rods 49 and fixedly installed on the upper frame 11 through a pair of rear brackets 50.

In accordance with the present invention, as shown in FIG. 3, each of second reinforcing pieces 58 is installed on each inside of the edges of the upper supporting frame 47 formed by the cross member 60 and reinforcing pieces having the same shape as the second reinforcing pieces 58 are installed on insides of the upper edges of the lower supporting frame 48.

Meanwhile, the top supporting frame 61 is defined by a pair of upper supporting rods 62 between the ends of the top plate 43 of the above-described front supporting frame 41 and the ends of the rear top supporting rods 53 of the rear supporting frame 51. A plurality of auxiliary beams 54 separated in parallel along a lengthwise direction is installed on the insides of the pair of upper supporting rods 62 and a middle supporting beam 56 is fixedly installed on the upper supporting rods 62 extending horizontally so as to fix each of the auxiliary beams 54 by a predetermined distance. In this result, a plurality of load dispersing frame 55 is formed inside of the top supporting frame 61.

Each of third reinforcing pieces 57 is also fixedly installed outsides of the edges formed by the upper supporting rods 62, each of the front supporting rods 42 and the rear upper supporting rods 52.

The above-described first reinforcing pieces 59, second reinforcing pieces 58 and third reinforcing pieces 57 play a role of supporting the inner stress and plasticity generated in the front supporting frames 41, the rear supporting frame 51 and the top supporting frame 61 when a construction machine is overturned or a load of a heavy object is unexpectedly applied to the cabin 30 from the side, the rear and the vertical directions. The plurality of auxiliary beams 54 forming the top supporting frame 61 plays a role of supporting the load applied from the side and the rear, and the plurality of auxiliary beams 54 forming the load dispersing frame 55 plays a role of dispersing the load applied along the vertical direction.

On the other hand, in accordance with another embodiment of the present invention, the structure of the first embodiment that connects the rear supporting rods 49, 52 and the cross member 60 can be modified into a new structure as shown in FIG. 3. Each rear upper supporting rods 52 forming the upper supporting frame 47 of the rear supporting frame 51 is erected vertically and fixed to the cross member 60, the rear lower supporting rods 49 extend from the cross member 60 to the lower direction and are fixedly installed on the upper frame 11 of the construction machine 10.

In this case, it is included in the technical scope of the present invention described in the above-described first embodiment that each of the second reinforcing pieces 58 is installed on the edges of the upper supporting frame 47 and the lower supporting frame 48 forming the rear supporting frame 51 and each of the third reinforcing pieces 57 is installed on external sides of the edges formed by the front supporting rods 42, the rear upper supporting rods 52 and the upper supporting rods 62. This modification is to form a structure with which the rear portion of the cabin 30 is encompassed by the rear supporting frame 51. At the same time, it is to enable the easy installation of an engine room 12 and a body panel 13 on the rear side of the cabin 30 in the construction machine such as a loader.

In accordance with the present invention, it is preferable that the front supporting rods 42, the rear upper supporting rods 52, the rear lower supporting rods 49 and the upper supporting rods 62 to form each of the front supporting frames 41, the rear supporting frame 51 and the top supporting frame 61 be made of a metal such as an iron or a high intensity alloy including an aluminum for the sake of lightweight structure.

And also, it is preferable that the above-described first reinforcing pieces 59, the second reinforcing pieces 58 and the third reinforcing pieces 57 be fixedly connected to the outsides of each supporting rods by welding so as to cover at least one part of the edges prepared at each of the front supporting frames 41, the rear supporting frame 51 and the top supporting frame 61. And these reinforcing pieces can be connected through a connection member such as a bolt.

The functions and effects of the present invention described above are as follows.

In the operator protective structure in accordance with the present invention, as shown in FIGS. 1 to 3, each of the front brackets 45 of the front supporting frame 41 and the rear brackets 50 of the rear supporting frame 51 are fixedly installed on both ends of the upper frame 11 facing the bottom of the cabin 30. The cabin 30 is installed on the upper frame 11 with a plurality of holes 63. Therefore, each edge of the front supporting frame 41 and the rear supporting frame 51 are formed by extending the front supporting rods 42, the rear upper supporting rods 52 and the rear lower supporting rods 49 so as to be separated by a predetermined distance from the external surface of the cabin 30. The operator protective structure is installed as a frame structure encompassing the cabin 30 by the top supporting frame 61 defined by the top plates 43, auxiliary beams 54 and so on. When a dynamic load or a static load is applied to the sides or the rear of the cabin 30 by the accident or the overturning of the construction machine 10, the operator protective structure primarily performs the functions of absorbing and dispersing the damages by each of the front supporting frames 41, the rear supporting frame 51 and the top supporting frame 61 and by each of the upper supporting frame 47 and the lower supporting frame 48.

In structural point of view, it is generally known that the stress generated at a frame structure such as a lattice type by an external load concentrates on the joint portion or the interconnection portion of the frame. As the first reinforcing pieces 59, the second reinforcing pieces 58 and the third reinforcing pieces 57 in accordance with the present invention reinforce the strength of the supporting rods forming each of the connection parts, the stress deformation and the plasticity deformation of each frame during the overturning accident or the safety accident are minimized. As the inner stress generated at each of the front supporting frames 41, the rear supporting frame 51 and the top supporting frame 61 is effectively supported and dispersed by this structure when the construction machine 10 such as an excavator is overturned or the load of a heavy object is unexpectedly applied from the side, the rear and the vertical direction, so the cabin 30 is not deformed or damaged. On the other hand, a dynamic load applied to the top plate of the cabin 30 in the vertical direction by a falling body such as a sharp metal or a heavy object is supported by a plurality of auxiliary beams 54 which forms a plurality of load dispersion frames 55 on the top supporting frame 61 in accordance with the present invention. At the same time the stress applied by a falling body is continuously dispersed by each of the front supporting frames 41, the rear supporting frame 51 and the top supporting frame 61 and by each of the first reinforcing pieces 57, the second reinforcing pieces 58 and the third reinforcing pieces 59. Therefore, the present invention can protect the cabin 30 and the operator inside of the cabin 30 safely by preventing the stress deformation and the plastic deformation of the cabin 30 from invading the boundary of driver's work.

In the above-described invention, although the operator protective structure in accordance with the present invention is described for the cabin such as an excavator as an example, those skilled in the art should understand that the application of the present invention to another construction vehicle provided with a cabin be included within the scope of the following claims of the present invention.

As described above, as the load or impact applied from the side, the rear and the vertical directions is supported or dispersed by constructing the frame structure encompassing the cabin of the construction machine the front supporting frames, the upper supporting frame and the rear supporting frames, so the deformation and damages of the cabin of the construction machine such as an excavator is prevented. The present invention has an effect that an operator is safely protected in the cabin by preventing a stress deformation and a plastic deformation from invading the boundary of driver's work although the stress deformation and the plastic deformation of the cabin occurred during the overturning accident of the construction machine or the safety accident due to a falling body.

The present application contains subject matter related to Korean paten application no. 2005-37939, filed in the Korean Patent Office on May 6, 2005, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An operator protective structure for installation on a cabin of construction machine, wherein the cabin is for mounting on an upper frame rotatably mounted on a lower driving body, the structure comprising
 a front supporting frame provided with a pair of front supporting rods for vertically installing on one end of the upper frame;
 a rear supporting frame provided with a plurality of rear supporting rods for vertically installing on the other end of the upper frame to encompass the cabin; and
 a top supporting frame defined by a pair of top supporting rods extended from an upper end of the front supporting frame to an upper end of the rear supporting frame and provided with a plurality of auxiliary beams between the top supporting rods,
 wherein the rear supporting rods comprises rear upper supporting rods and rear lower supporting rods, a cross member for installing horizontally between the rear upper supporting rods and the rear lower supporting rods to divide the rear supporting frame into an upper supporting frame and a lower supporting frame, and a plurality of second reinforcing pieces for installing on each edges of the upper supporting frame and the lower supporting frame.

2. The operator protective structure as recited in claim 1, wherein the front supporting frame further comprises a bottom plate connected to the upper frame and supporting lower ends of the front supporting rods.

3. The operator protective structure as recited in claim 2, wherein a plurality of first reinforcing pieces is installed on edges of the front supporting frame.

4. An operator protective structure for installation on a cabin of construction machine, wherein the cabin is for mounting on an upper frame rotatably mounted on a lower driving body, the structure comprising:
 a front supporting frame provided with a pair of front supporting rods for vertically installing on one end of the upper frame;
 a rear supporting frame provided with a plurality of rear supporting rods for vertically installing on the other end of the upper frame to encompass the cabin; and
 a top supporting frame defined by a pair of top supporting rods extended from an upper end of the front supporting frame to an upper end of the rear supporting frame and provided with a plurality of auxiliary beams between the top supporting rods,
 wherein the rear supporting rods comprises rear upper supporting rods and rear lower supporting rods, a cross member for installing horizontally between the rear upper supporting rods and the rear lower supporting rods to divide the rear supporting frame into an upper supporting frame and a lower supporting frame.

5. The operator protective structure as recited in claim 4, a plurality of second reinforcing pieces is installed on each edges of the upper supporting frame and the lower supporting frame.

6. The operator protective structure as recited in claim 5, wherein a plurality of third reinforcing pieces is installed on edges at which the top supporting rods, the rear supporting rods and the front supporting rods meet each other.

7. An operator protective structure suitable to encompass on a cabin of construction machine, wherein the cabin is mounted on an upper frame (11) rotatably mounted on a lower driving body, the structure comprising:

a front supporting frame (41) provided with a pair of front supporting rods (42) vertically installable on one end of the upper frame (11);

a rear supporting frame (51) provided with a plurality of rear supporting rods (49), (52) vertically installable proximate the center of the upper frame (11) by a pair of rear brackets (50) to encompass the cabin; and a top supporting frame (61) defined by a pair of top supporting rods (62) from an upper end of the front supporting frame (41) to an upper end of the rear supporting frame (51) to encompass the cabin and provided with a plurality of auxiliary beams (54) between the top supporting rods (62);

wherein the front supporting rods (42) is horizontally installed with the both ends of a bottom plate (44) to the both ends of an top plate (43), and the both ends of a bottom plate (44) forming lower edges of the front supporting frame (41) are installed on the upper frame (11) by a pair of front brackets (45) and fixed on the lower edges of the front supporting frame (41) by a plurality of first reinforcing pieces (59); and the rear supporting rods (51) comprises rear upper supporting rods (52), rear lower supporting rods (49), a cross member (60) is horizontally installed between a rear upper supporting rods (52) and a rear lower supporting rods (49), and a plurality of second reinforcing pieces (58) is installed on each edges of an upper supporting frame (47) and a lower supporting frame (48) so that the rear lower supporting rods (49) is defined with each of an upper supporting frame (47) and a lower supporting frame (48).

8. The operator protective structure as recited in claim 7, a plurality of third reinforcing pieces is installed on edges at which the top supporting rods, the rear supporting rods and the front supporting rods meet each other.

\* \* \* \* \*